United States Patent
Sun et al.

(10) Patent No.: US 11,729,754 B2
(45) Date of Patent: Aug. 15, 2023

(54) COMMUNICATION METHOD, ACCESS NETWORK DEVICE, AND TERMINAL

(71) Applicant: Huawei Technologies Co., Ltd., Shenzhen (CN)

(72) Inventors: Wei Sun, Shenzhen (CN); Lei Wan, Beijing (CN); Zhiheng Guo, Beijing (CN); Xingqing Cheng, Beijing (CN); Xinqian Xie, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 885 days.

(21) Appl. No.: 16/504,003

(22) Filed: Jul. 5, 2019

(65) Prior Publication Data
US 2019/0327744 A1 Oct. 24, 2019

Related U.S. Application Data

(63) Continuation of application No. PCT/CN2017/118238, filed on Dec. 25, 2017.

(30) Foreign Application Priority Data

Jan. 6, 2017 (CN) .......................... 201710010644.2

(51) Int. Cl.
*H04W 72/04* (2023.01)
*H04W 72/0453* (2023.01)

(52) U.S. Cl.
CPC ............................. *H04W 72/0453* (2013.01)

(58) Field of Classification Search
CPC ........... H04W 74/0833; H04W 72/042; H04W 52/146; H04W 72/0413; H04W 74/002;
(Continued)

(56) References Cited

U.S. PATENT DOCUMENTS 8,331,331 B2 12/2012 Luo
8,634,313 B2 * 1/2014 Tenny ............... H04W 56/0045
370/336
(Continued)

FOREIGN PATENT DOCUMENTS

CN 101599936 A 12/2009
CN 102461287 A 5/2012
(Continued)

OTHER PUBLICATIONS

Huawei et al., "Considerations of NR UL operation on the uplink band of LTE", 3GPP TSG RAN WG1 NR Ad-Hoc Meeting, R1-1700032, Spokane, WA, USA, Jan. 16-20, 2017, 6 pages.
(Continued)

*Primary Examiner* — Awet Haile
(74) *Attorney, Agent, or Firm* — Slater Matsil, LLP

(57) ABSTRACT

A first access network device determines a timing offset of a first carrier and a second carrier. The timing offset is an offset between timing of downlink communication of the first carrier and timing of uplink communication of the second carrier. The first carrier is a carrier using a first radio access technology (RAT), and the second carrier is an uplink frequency division duplex (FDD) carrier using the first RAT and a second RAT. The first access network device sends first indication information to a terminal. The first indication information indicates the timing offset, and the timing offset is used to determine the timing of the second carrier. Based on this scheme, the terminal can use a shared frequency band resource of LTE, thereby improving resource utilization.

20 Claims, 4 Drawing Sheets

(58) Field of Classification Search
CPC . H04W 72/14; H04W 48/08; H04W 72/1268; H04W 4/40; H04W 56/0005; H04W 56/0015; H04W 56/005; H04W 72/0453; H04W 72/04; H04L 5/0055; H04L 2001/0093; H04L 5/0035
See application file for complete search history.

(56) References Cited

U.S. PATENT DOCUMENTS

| | | | |
|---|---|---|---|
| 2011/0075640 | A1 | 3/2011 | Mo et al. |
| 2011/0158116 | A1 | 6/2011 | Tenny et al. |
| 2014/0376425 | A1* | 12/2014 | Han ................ H04W 74/0833 370/280 |
| 2015/0131536 | A1 | 5/2015 | Kaur et al. |
| 2018/0007673 | A1* | 1/2018 | Fwu ..................... H04L 5/0092 |
| 2018/0070369 | A1* | 3/2018 | Papasakellariou ......................... H04W 72/1215 |
| 2019/0089498 | A1* | 3/2019 | Pelletier ................ H04L 5/003 |
| 2019/0090221 | A1* | 3/2019 | Nigam ................ H04W 72/04 |

FOREIGN PATENT DOCUMENTS

| | | |
|---|---|---|
| CN | 103096456 A | 5/2013 |
| CN | 103370896 A | 10/2013 |
| CN | 104219758 A | 12/2014 |
| CN | 105376849 A | 3/2016 |
| CN | 107210810 A | 9/2017 |
| JP | 2012525083 A | 10/2012 |
| JP | 2013502778 A | 1/2013 |
| JP | 2013528971 A | 7/2013 |
| JP | 5709904 B2 | 4/2015 |
| JP | 2016034113 A | 3/2016 |
| WO | 2010148404 A1 | 12/2010 |
| WO | 2014027495 A1 | 2/2014 |
| WO | 2014038830 A1 | 3/2014 |
| WO | 2015020403 A1 | 2/2015 |
| WO | 2016130175 A1 | 8/2016 |
| WO | 2016159643 A1 | 10/2016 |

OTHER PUBLICATIONS

Qualcomm Inc., "LS on DL timing difference and DL timing reference in Carrier Aggregation", 3GPP TSG-RAN WG2 Meeting #70, R2-103443, Montreal, Canada, May 10-14, 2010, 1 page.

3rd Generation Partnership Project; Technical Specification Group Radio Access Network; Evolved Universal Terrestrial Radio Access (E-UTRA); Physical layer procedures (Release 15), 3GPP TS 36.213 V15.6.0 (Jun. 2019), 551 pages.

3rd Generation Partnership Project; Technical Specification Group Radio Access Network; NR; Physical layer procedures for control (Release 15), 3GPP TS 38 213 V15.6.0 (Jun. 2019), 107 pages.

* cited by examiner

COMMUNICATION METHOD, ACCESS NETWORK DEVICE, AND TERMINAL

CROSS-REFERENCE TO RELATED APPLICATIONS

This application is a continuation of International Application No. PCT/CN2017/118238, filed on Dec. 25, 2017, which claims priority to Chinese Patent Application No. 201710010644.2, filed on Jan. 6, 2017. The disclosures of the aforementioned applications are hereby incorporated by reference in their entireties.

TECHNICAL FIELD

The present invention relates to the field of communications, and in particular, to a communication method, an access network device, and a terminal.

BACKGROUND

In the evolution of a communication system, a frequency band below 6 GHz may exist in both a 5G new radio (NR) system and a Long Term Evolution (LTE) system. In other words, a same frequency band may exist in 5G NR and LTE, and performance of 5G NR and performance of LTE cannot affect each other. From the perspective of frequency band utilization, for some frequency bands on which LTE is deployed, because a requirement of service traffic changes, utilization of a frequency band on which LTE is deployed may be relatively low. For example, for an uplink frequency band, because uplink service traffic is relatively low, utilization of an LTE frequency division duplex uplink (FDD UL) frequency band is relatively low. A part of bandwidth of these frequency bands, or some of subframes of these frequency bands may be used in 5G NR to carry 5G NR transmission. In other words, the 5G NR and the LTE can be multiplexed in one frequency band, to share a same frequency band resource.

As shown in FIG. 3, f1 is an LTE FDD downlink (DL) carrier, f2 is an FDD uplink carrier whose resource is shared by an LTE UL and a 5G NR UL, and f3 is a 5G NR dedicated carrier. On the carrier f2, LTE has a priority to be deployed, and frame and subframe timing of the carrier f2 are in accordance with timing of LTE. In this case, some of the subframes on the carrier f2 need to be used in 5G NR, and subframe timing also needs to be in accordance with the subframe timing of LTE. However, for the carrier f3, independent timing exists in 5G NR. For 5G NR, timing of the carrier f2 and timing of the carrier f3 may be different, and subcarrier intervals, subframe lengths, and transmission time interval (TTI) lengths may also be different.

However, for a 5G NR user equipment whose initial access is on the carrier f3 of 5G NR, when the 5G NR user is scheduled or configured to be on a shared carrier f2, the 5G NR user cannot obtain a time location of the shared carrier f2, for example, a subframe location. In addition, FDD timing of different LTE base stations are not synchronous. When the 5G NR user moves and a handover between base stations occurs, the 5G NR user cannot know time location of the shared carrier f2 of different LTE base stations during the handover.

SUMMARY

This application provides a communication method, an access network device, and a terminal, to resolve a problem of different timing of a first carrier and a second carrier, thereby improving frequency band resource utilization.

According to a first aspect, a communication method is provided, where the method may include: determining, by a first access network device, a timing offset of a first carrier and a second carrier, where the timing offset is an offset between timing of downlink communication of the first carrier and timing of uplink communication of the second carrier.

According to a second aspect, a communication method is provided, where the method may include: receiving, by a terminal, first indication information from a first access network device, where the first indication information is used to indicate a timing offset of a first carrier and a second carrier; and determining, by the terminal, timing of the second carrier based on timing of the first carrier and the timing offset, where the timing offset is an offset between the timing of downlink communication of the first carrier and the timing of uplink communication of the second carrier.

It should be noted that, the foregoing aspects may further have the following optional implementations.

Optionally, a value of the timing offset may be positive or negative. The first access network device sends first indication information to the terminal, where the first indication information is used to indicate the timing offset, and the timing offset is used to determine the timing of the second carrier. According to the method, an indication of the timing offset is used, so that the terminal obtains the timing of the second carrier and therefore can use a shared frequency band resource on the second carrier, thereby improving resource utilization.

Optionally, the timing of the second carrier may be a subframe boundary at which an access network device receives, on the second carrier, an uplink signal sent by the terminal. Alternatively, the timing of the second carrier may be a symbol boundary at which an access network device receives, on the second carrier, an uplink signal sent by the terminal. Alternatively, the timing of the second carrier may be a start location at which the terminal sends an uplink signal on the second carrier.

In an optional implementation, the timing offset is a timing offset of the first carrier of the first access network device and the second carrier of the first access network device.

Optionally, the first carrier may be a carrier using a first radio access technology RAT, and the second carrier may be an uplink frequency division duplex FDD carrier using the first RAT and a second RAT.

Optionally, the timing offset is a time difference between a subframe boundary of the first carrier and a subframe boundary of the second carrier. Alternatively, the timing offset is a time difference between a symbol boundary of the first carrier and a symbol boundary of the second carrier.

Optionally, the timing offset is a time difference between a subframe or symbol boundary of the first carrier and a start location of an uplink signal of the second carrier.

Optionally, the timing offset is a timing offset of the first carrier of the first access network device and the second carrier of the first access network device. Accordingly, the determining, by a first access network device, a timing offset of a first carrier and a second carrier includes: determining, by the first access network device, the timing offset of the first carrier of the first access network device and the second carrier of the first access network device.

Optionally, that the first access network device sends first indication information to the terminal includes: the first access network device sends the first indication information to the terminal by using a system message carried on the first carrier. Accordingly, the receiving, by a terminal, first indication information from a first access network device includes: receiving, by the terminal by using the system message carried on the first carrier, the first indication information from the first access network device.

The broadcast system message is sent to the terminal, to ensure that all terminals in a cell can receive the first indication information, that is, ensures that all terminals receive the timing offset. In addition, the system message is usually sent periodically. This can also improve reliability of receiving.

In an optional implementation, the timing offset is a timing offset of a first carrier of a second access network device and a second carrier of the second access network device. Accordingly, the determining, by a first access network device, a timing offset of a first carrier and a second carrier includes: receiving, by the first access network device, second indication information from the second access network device, where the second indication information is used to indicate the timing offset of the first carrier of the second access network device and the second carrier of the second access network device. The first access network device is a source access network device accessed by the terminal, the second access network device is a target access network device for handover of the terminal, and the first access network device determines the timing offset of the first carrier of the second access network device and the second carrier of the second access network device based on the second indication information. Accordingly, the determining, by the terminal, timing of the second carrier includes: determining, by the terminal, the timing of the second carrier of the second access network device based on the timing offset of the first carrier of the second access network device and the second carrier of the second access network device, and the timing of the first carrier of the second access network device.

In this solution, when the terminal is handed over from the first access network device to the second access network device, because timing of second carriers of different access network devices is different, the first access network device needs to notify the terminal of the timing offset of the first carrier and the second carrier again, so that the terminal obtains the timing of the second carrier.

Optionally, that the first access network device sends first indication information to the terminal includes: the first access network device sends the first indication information to the terminal by using the system message carried on the first carrier, or the first access network device sends the first indication information to the terminal by using a radio resource control connection reconfiguration (RRC Connection Reconfiguration) message carried on the first carrier. Accordingly, the receiving, by a terminal, first indication information from a first access network device includes: receiving, by the terminal by using the system message carried on the first carrier or the radio resource control connection reconfiguration message, the first indication information from the first access network device.

Optionally, the first access network device sends third indication information to the terminal by using higher layer signaling carried on the first carrier, where the third indication information is used to indicate an available resource of the second carrier of the first access network device, and the first access network device receives, on the second carrier, a signal sent by the terminal by using the available resource. Accordingly, the terminal receives, by using the higher layer signaling carried on the first carrier, the third indication information from the first access network device, and the terminal sends a signal to the first access network device by using the available resource, where the higher layer signaling may be a system message, or radio resource control (RRC) signaling, so that the terminal recognizes the available resource of the second carrier, thereby implementing uplink communication.

Optionally, the first access network device sends third indication information to the terminal by using higher layer signaling, where the third indication information is used to indicate an available resource of the second carrier of the second access network device, and the second access network device receives, on the second carrier, a signal sent by the terminal by using the available resource. Accordingly, the terminal receives, by using the higher layer signaling carried on the first carrier, the third indication information sent by the first access network device. The terminal sends the signal to the second access network device on the second carrier by using the available resource, thereby implementing uplink communication.

In the solution, when the terminal is handed over from the first access network device to the second access network device, the first access network device sends the third indication information to the terminal by using the system message, or the RRC signaling, or the radio resource control connection reconfiguration message, to indicate the available resource of the second carrier of the second access network device, thereby implementing uplink communication.

Optionally, the first access network device sends third indication information to the terminal by using physical layer signaling carried on the first carrier, where the third indication information includes delay information, and the delay information is used to indicate a quantity of available slots of the second carrier, or the delay information is used to indicate a quantity of available slots of the first carrier. Accordingly, the terminal receives, by using the physical layer signaling carried on the first carrier, the third indication information from the first access network device.

Optionally, the delay information is used to indicate the quantity of available slots of the second carrier, and the terminal obtains a slot of the second carrier based on the timing of the second carrier, where the slot of the second carrier is a slot that is on the second carrier and that corresponds to the slot in which the third indication information is received. The terminal obtains an available resource of the second carrier based on the slot of the second carrier and the delay information. The terminal sends a signal to the first access network device by using the available resource of the second carrier.

Optionally, the delay information is used to indicate the quantity of available slots of the first carrier, and the terminal obtains an available slot of the first carrier based on the slot in which the third indication information is received and the delay information. The terminal obtains, based on the timing of the second carrier, an available resource that is of the second carrier and that corresponds to the available slot of the first carrier. The terminal communicates with the first access network device by using the available resource of the second carrier.

Optionally, the first access network device sends fourth indication information to the terminal by using higher layer signaling carried on the first carrier. Accordingly, the terminal receives, by using the higher layer signaling carried on the first carrier, the fourth indication information from the first access network device, where the fourth indication information is used to indicate resource configuration information of the second carrier, and a resource indicated by the resource configuration information of the second carrier is an unavailable resource of the terminal.

Optionally, the higher layer signaling may be a system message, or RRC signaling.

Optionally, the third indication information and the fourth indication information of the higher layer signaling carried on the first carrier may be carried in one message.

Optionally, the determining, by the terminal, timing of the second carrier includes: determining, by the terminal, a subframe boundary of the second carrier based on a subframe boundary of the first carrier and the timing offset, or determining, by the terminal, a symbol boundary of the second carrier based on a symbol boundary of the first carrier and the timing offset.

Optionally, the determining, by the terminal, timing of the second carrier includes: determining, by the terminal, based on the timing offset and a subframe boundary or symbol boundary of the first carrier, a start location at which an uplink signal is sent on the second carrier, where the uplink signal may be a physical random access channel (PRACH) signal, or a physical uplink shared channel (PUSCH) signal, or another uplink signal.

The subframe boundary of the first carrier may be a subframe boundary at which an access network device performs downlink communication on the first carrier, and the symbol boundary of the first carrier may be a symbol boundary at which an access network device performs downlink communication on the first carrier; and the subframe boundary of the second carrier may be a subframe boundary at which the access network device receives, on the second carrier, an uplink signal from the terminal, and the symbol boundary of the second carrier may be a symbol boundary at which the access network device receives, on the second carrier, an uplink signal from the terminal.

According to a third aspect, an access network device is provided, where the access network device is a first access network device, and the access network device has a function of implementing actual access network device behavior in the foregoing method. The function may be implemented by hardware, or may be implemented by hardware executing corresponding software, and the hardware or software includes one or more modules corresponding to the function.

According to a fourth aspect, a terminal is provided, where the terminal has a function of implementing actual terminal behavior in the foregoing method. The function may be implemented by hardware, or may be implemented by hardware executing corresponding software, and the hardware or software includes one or more modules corresponding to the function.

According to a fifth aspect, another access network device is provided, where the access network device is a first access network device, and the access network device may include a processor and a transmitter. The processor is configured to determine a timing offset of a first carrier and a second carrier, where the timing offset is an offset between timing of downlink communication of the first carrier and timing of uplink communication of the second carrier, and a value of the timing offset may be positive or negative. The transmitter is configured to send first indication information to a terminal, where the first indication information is used to indicate the timing offset, and the timing offset is used to determine the timing of the second carrier.

According to a sixth aspect, a computer storage medium is provided, and is configured to store a computer software instruction used by the foregoing access network device, and the computer software instruction includes a program designed to perform the foregoing aspects.

According to a seventh aspect, another terminal is provided, where the terminal may include a receiver and a processor. The receiver is configured to receive first indication information from a first access network device, where the first indication information is used to indicate a timing offset of a first carrier and a second carrier, and the timing offset is an offset between timing of downlink communication of the first carrier and timing of uplink communication of the second carrier. A value of the timing offset may be positive or negative. The processor is configured to determine the timing of the second carrier based on the timing offset.

According to an eighth aspect, another computer storage medium is provided, and is configured to store a computer software instruction used by the foregoing terminal, and the computer software instruction includes a program designed to perform the foregoing aspects.

BRIEF DESCRIPTION OF THE DRAWINGS

To describe the technical solutions in the embodiments of the present invention more clearly, the following briefly introduces the accompanying drawings required for describing the embodiments.

DETAILED DESCRIPTION OF ILLUSTRATIVE EMBODIMENTS

The following further describes the technical solutions of the present invention in detail with reference to the accompanying drawings and embodiments.

Figure 1:
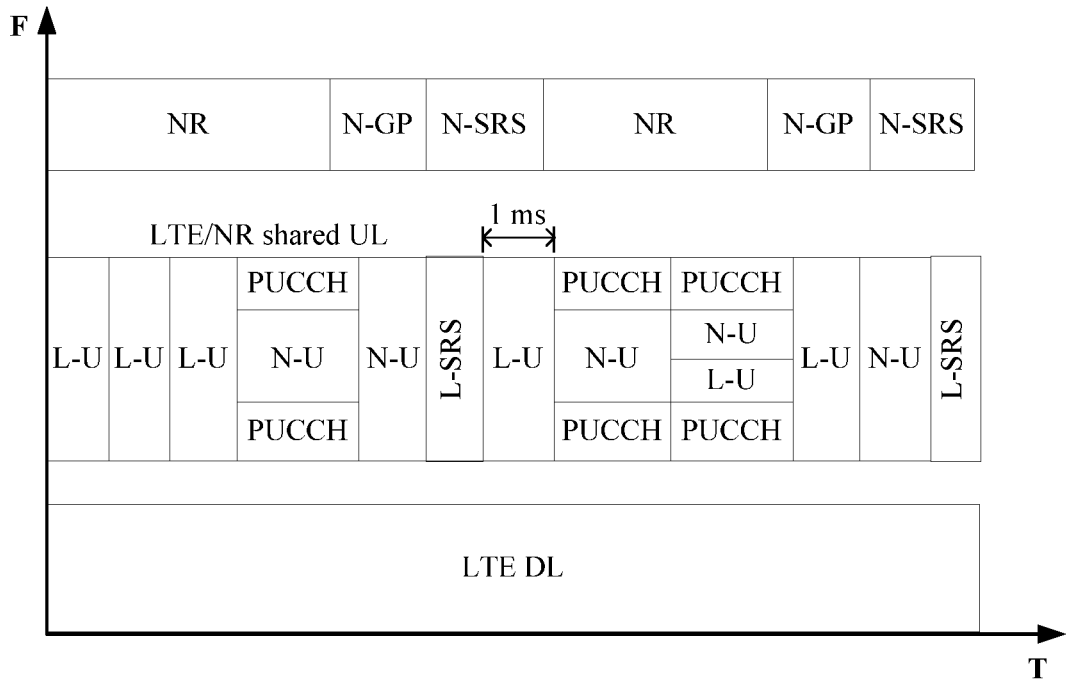
FIG. 1 is a schematic diagram of a scenario in which a first carrier and a second carrier shares a resource of an uplink frequency band according to an embodiment of the present invention.

This application may be applied to sharing of frequency band resources between two communication systems with different radio access technologies (RAT), such as LTE and 5G NR, LTE and 3G, and 3G and 5G NR. FIG. 1 is a schematic diagram of a scenario of a first carrier and a second carrier according to an embodiment of the present invention. An example in which the first carrier is a 5G NR dedicated carrier, and the second carrier is an uplink carrier shared by 5G NR and LTE is used for description below.

The 5G NR system can not only support a carrier frequency below 6 GHz, but also support a carrier frequency above 6 GHz, such as 30 GHz; and the 5G NR system can not only support a single-carrier mode, but also support a carrier aggregation mode. An LTE system supports a carrier frequency below 6 GHz, including paired FDD spectrums and unpaired TDD spectrums, and carrier aggregation of carriers in a same duplex mode or different duplex modes. A carrier on which LTE is deployed may have relatively low frequency band utilization, such as an uplink carrier. For carriers below 6 GHz, 5G NR and LTE may be multiplexed on a carrier to share a same frequency band resource, so as to improve frequency band utilization.

As shown in FIG. 1, the horizontal axis in the coordinate diagram represents time, and the vertical axis represents frequencies. The 5G NR dedicated carrier is the first carrier, 5G NR and LTE share an uplink FDD carrier of the LTE, and the carrier shared by 5G NR and LTE is the second carrier. The 5G NR dedicated carrier may be used to transmit only downlink signals, or the 5G NR dedicated carrier may further include a 5G NR guard period GP and may be further used to transmit a 5G NR sounding reference signal (SRS). An FDD carrier is used as an example of an LTE carrier, and FDD frequency bands include a downlink carrier and an uplink carrier. A subframe length of an LTE carrier is 1 ms, and a 5G NR uplink signal may be carried in some subframes of the uplink carrier. In other words, the uplink carrier is a carrier shared by the LTE and the 5G NR. The uplink carrier may include information about a physical uplink shared channel (PUSCH) of the LTE carrier, information about a physical uplink control channel (PUCCH) of the LTE carrier, and information about an SRS of the LTE carrier. The information about the PUCCH and the SRS are periodic configuration information. When 5G NR shares a carrier with LTE, to prevent LTE from being interfered with, a collision with the PUCCH and the SRS of LTE needs to be avoided during a sharing process. In other words, the 5G NR uplink signal needs to avoid resources of the PUCCH and the SRS of the LTE carrier.

5G NR coexists with LTE in the uplink carrier. In other words, 5G NR shares the LTE uplink carrier. A 5G NR signal may be transmitted on an idle subframe or idle resource block of the LTE uplink carrier. In this case, timing of a shared uplink carrier conforms to timing of LTE in the uplink carrier. Timing of the 5G NR dedicated carrier may be different from that of shared uplink carrier, and subcarrier spacing, subframe lengths and TTI lengths may be all different. Consequently, there may be an offset between timing of the 5G NR in the shared uplink carrier and that in the dedicated carrier. Therefore, in this application, an access network device notifies a 5G NR terminal of a timing offset of two carriers to make the 5G NR terminal obtain a time location of the shared uplink carrier, such as a subframe location, or a symbol location, so that the 5G NR terminal may perform uplink communication with the access network device on the shared uplink carrier.

The terminal in this application may include various handheld devices, in-vehicle devices, wearable devices, and computing devices that have a wireless communication function, other processing devices connected to a wireless modem, user equipments (UE) that are in various forms, and the like.

The access network device in this application may be a base station in GSM or CDMA, such as a base transceiver station (BTS for short), or a base station in WCDMA, such as a NodeB, or an evolved NodeB in LTE, such as an eNB or an eNodeB, or a base station in 5G system, such as a gNB, or a base station in other future networks, which is not limited in this embodiment of the present invention. For ease of description, the foregoing access network devices in this application may be collectively referred to as a base station.

Figure 2:
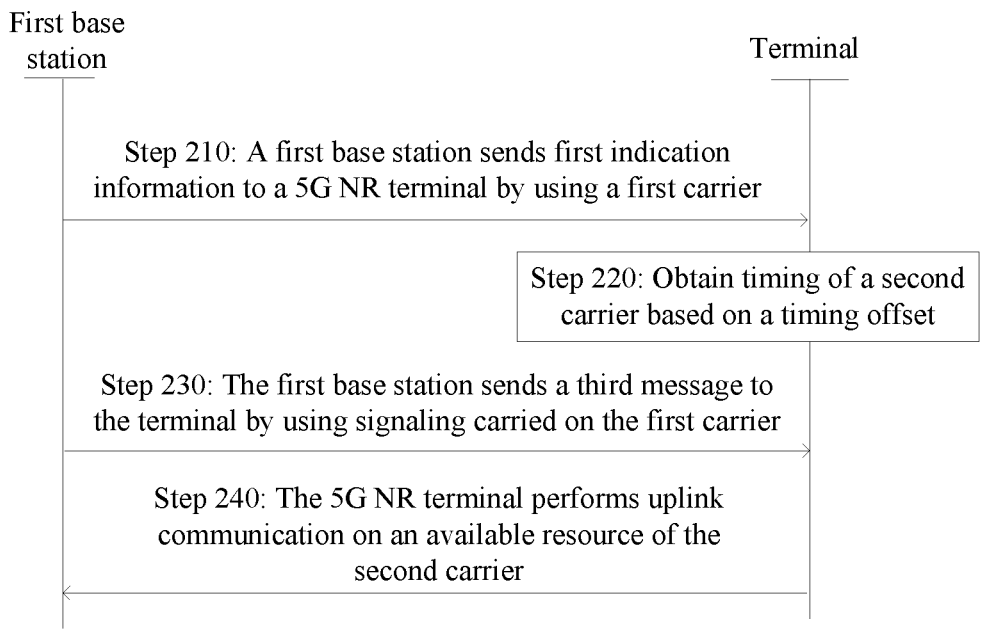
FIG. 2 is a signaling diagram of a communication method according to an embodiment of the present invention.

FIG. 2 is a signaling diagram of a communication method according to an embodiment of the present invention. As shown in FIG. 2, the method may include the following steps.

A first carrier may be a 5G NR dedicated carrier, and a second carrier may be an LTE uplink frequency division duplex FDD carrier shared by 5G NR and LTE.

Step 210: A first base station sends first indication information to a 5G NR terminal by using the first carrier.

The first base station determines a first timing offset $T_{offset}$ of the first carrier of the first base station and the second carrier of the first base station, where the timing offset is an offset between timing of downlink communication of the first carrier and timing of uplink communication of the second carrier. The first base station sends a first message to the 5G NR terminal by using the first carrier, where the first message includes the first indication information, and the first indication information is used to indicate the first timing offset of the first carrier and the second carrier.

The timing offset may be a time difference between a subframe boundary of the first carrier and a subframe boundary of the second carrier. Alternatively, the timing offset may be a time difference between a slot boundary of the first carrier and a slot boundary of the second carrier. Alternatively, the timing offset may be a time difference between a symbol boundary of the first carrier and a symbol boundary of the second carrier.

Optionally, the timing offset indicates a time difference between a subframe or symbol boundary of the first carrier and a start location at which a physical random access channel (PRACH) or another uplink signal is sent on the second carrier.

It should be noted that, a value of the timing offset may be positive or negative.

The subframe boundary of the first carrier may be a subframe boundary for downlink communication performed by the first base station on the first carrier. The symbol boundary of the first carrier may be a symbol boundary for downlink communication performed by the first base station on the first carrier. The slot boundary of the first carrier may be a slot boundary for downlink communication performed by the first base station on the first carrier.

The subframe boundary of the second carrier may be a subframe boundary for the first base station receiving, on the second carrier, an uplink signal from the terminal. The symbol boundary of the second carrier may be a symbol boundary for the first base station receiving, on the second carrier, an uplink signal from the terminal. The slot boundary of the second carrier may be a slot boundary for the first base station receiving, on the second carrier, an uplink signal from the terminal.

The first message may be a system message, to ensure that the terminal receives the first indication information. The timing offset of the first carrier and the second carrier is the same for all terminals connected to the first base station, and a system message that is used to notify all accessed terminals in a broadcast manner is most effective.

Alternatively, the first message may be a radio resource control (RRC) signaling message.

Optionally, when the 5G NR terminal moves and a handover occurs, that is, when the 5G NR terminal accesses a different cell, the timing offset of the first carrier and the second carrier may vary because of different timing of FDD carriers of different LTE base stations, and the first base station needs to notify the 5G NR terminal of a timing offset of two carriers of a target base station for handover of the terminal. In other words, before performing step 210, the first base station needs to receive second indication information from a second base station, where the second indication information is used to indicate a timing offset of a first carrier of the second base station and a second carrier of the second base station. The first base station is a source base station accessed by the 5G NR terminal, and the second base station is a target base station for handover of the 5G NR terminal.

The first base station determines a second timing offset of the first carrier of the second base station and the second carrier of the second base station based on the second indication information.

Optionally, a subframe boundary of the first carrier may be a subframe boundary for downlink communication performed by the second base station on the first carrier. A symbol boundary of the first carrier may be a symbol boundary for downlink communication performed by the second base station on the first carrier. A slot boundary of the first carrier may be a slot boundary for downlink communication performed by the second base station on the first carrier.

Optionally, a subframe boundary of the second carrier may be a subframe boundary for the second base station receiving, on the second carrier, an uplink signal from the terminal. A symbol boundary of the second carrier may be a symbol boundary for the second base station receiving, on the second carrier, an uplink signal from the terminal. A slot boundary of the second carrier may be a slot boundary for the second base station receiving, on the second carrier, an uplink signal from the terminal.

Then, the first base station sends a second message to the 5G NR terminal by using the first carrier, where the second message may include the first indication information, and the second message may be a system message, or may be an RRC connection reconfiguration message.

It should be noted that, the first timing offset and the second timing offset may be different.

Step 220: The 5G NR terminal receives the first indication information, obtains a timing offset, and determines timing of the second carrier.

The timing offset may be the first timing offset or the second timing offset.

The timing offset may indicate a time difference between the subframe boundary of the first carrier and the subframe boundary of the second carrier. Alternatively, the timing offset may indicate a time difference between the slot boundary of the first carrier and the slot boundary of the second carrier. Alternatively, the timing offset may indicate a time difference between the symbol boundary of the first carrier and the symbol boundary of the second carrier.

Optionally, the timing offset may indicate a time difference between a subframe or symbol boundary of the first carrier and a start location at which a physical random access channel (PRACH) or another uplink signal is sent on the second carrier.

The 5G NR terminal determines the timing of the second carrier based on the timing offset.

Optionally, determining the timing of the second carrier is determining the subframe or symbol boundary of the second carrier, or determining the start location at which a PRACH or PUSCH signal or another uplink signal of the second carrier is sent.

Figure 3:
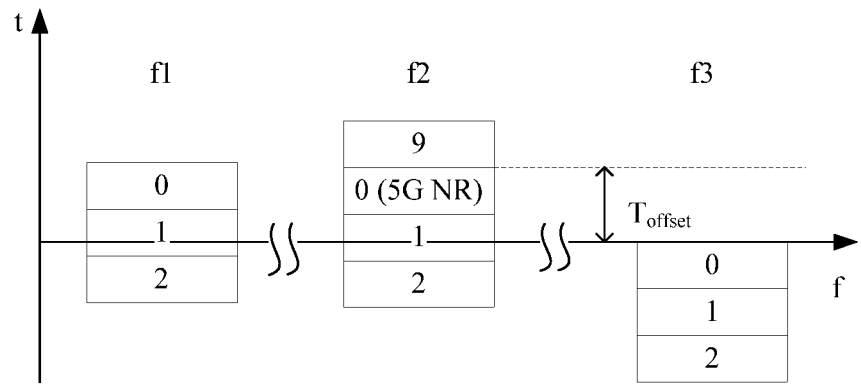
FIG. 3 is a schematic diagram of a timing offset of a first carrier and a second carrier with a same frame length according to an embodiment of the present invention.
Figure 4:
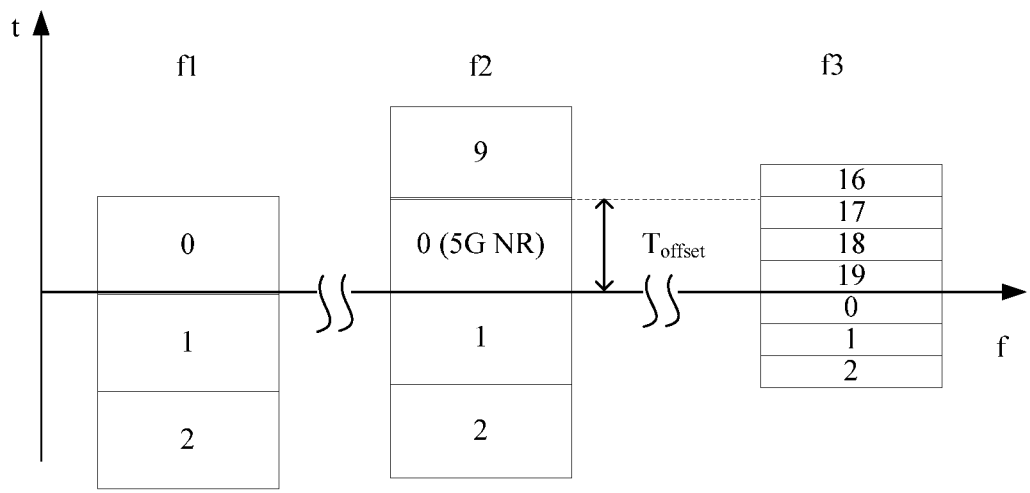
FIG. 4 is a schematic diagram of a timing offset of a first carrier and a second carrier with different frame lengths according to an embodiment of the present invention.

In an example, carrier f1 is an LTE downlink carrier, carrier f2 is a carrier shared by LTE and 5G NR, namely, the second carrier. Carrier f3 is a 5G NR dedicated carrier, namely, the first carrier. As shown in FIG. 3, when the carrier f2 and the carrier f3 have a same subframe length, the timing offset may be a time difference between a start boundary of subframe 0 on the carrier f3 and a start boundary of subframe 0 on a corresponding carrier f2. Alternatively, the timing offset may be a time difference between an end boundary of subframe 0 on the carrier f3 and an end boundary of subframe 0 on a corresponding carrier f2. Alternatively, the timing offset may be a time difference between a start boundary of the 1st symbol of subframe 0 on the carrier f3 and a start boundary of the $1^{st}$ t symbol of subframe 0 on a corresponding carrier f2. As shown in FIG. 4, when an LTE carrier and a 5G NR dedicated carrier have different subframe lengths, the timing offset is a time difference between a start boundary of subframe 0 on the carrier f3 and a start boundary of subframe 0 on a corresponding carrier f2. Alternatively, the timing offset is a time difference between an end boundary of subframe 0 on the carrier f3 and an end boundary of subframe 0 on a corresponding carrier f2. Alternatively, the timing offset is a time difference between a start boundary of the $1^{st}$ symbol of subframe 0 on the carrier f3 and a start boundary of the $1^{st}$ symbol of subframe 0 on a corresponding carrier f2. It should be noted that, this embodiment of the present invention does not limit a subframe number used for determining the timing offset, and the subframe number used for determining the timing offset may be subframe 0, or may be another subframe. This is not limited in this embodiment of the present invention.

Figure 5:
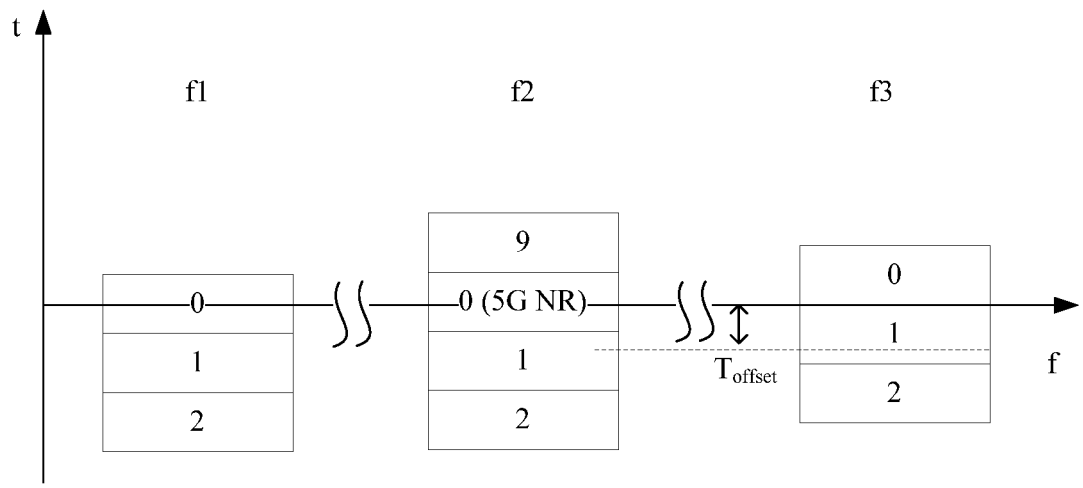
FIG. 5 is another schematic diagram of a timing offset of a first carrier and a second carrier with a same frame length according to an embodiment of the present invention.

In an example, the carrier f1 is an LTE downlink carrier, the carrier f2 is a carrier shared by LTE and 5G NR, namely, the second carrier. The carrier f3 is a 5G NR dedicated carrier, namely, the first carrier. As shown in FIG. 5, the timing offset is a time difference between a start boundary of subframe 0 or a start boundary of the first symbol on the carrier f3 and a start location at which an uplink PRACH signal or another uplink signal is sent on subframe 0 of a corresponding carrier f2. It should be noted that, this embodiment of the present invention does not limit a subframe number used for determining the timing offset, and the subframe number used for determining the timing offset may be subframe 0, or may be another subframe. This is not limited in this embodiment of the present invention.

Step 230: The first base station sends a third message to the terminal by using signaling carried on the first carrier.

The third message may include third indication information, to indicate an available resource of the second carrier, such as an available subframe (or slot).

The first base station may send the third indication information to the terminal by using higher layer signaling carried on the first carrier, such as a system message or RRC signaling, where the third indication information is used to indicate an available resource of the shared LTE carrier.

Optionally, when the terminal is handed over from the first base station to a second base station, the first base station may send the third indication information to the terminal by using a system message or an RRC connection reconfiguration message carried on the first carrier, where the third indication information is used to indicate an available resource of a second carrier of the second base station.

A manner of indicating an available resource of 5G NR on the second carrier is as follows.

When the resource of 5G NR on the second carrier is configured once at an interval of a time period (which is semi-static configuration), the third indication information is used to indicate an available subframe (or slot) number set of the 5G NR on the second carrier.

The 5G NR terminal communicates with the first base station on an available subframe of the second carrier based on the available subframe (or slot) number set on the second carrier.

Optionally, the first base station may send the third indication information to the 5G NR terminal by using physical layer signaling (for example, a downlink control information (DCI) message) carried on the first carrier. The third indication information is used to indicate that the 5G NR terminal is scheduled on the second carrier, and indicate a scheduled available subframe (or slot) number, a physical resource block (PRB), an available symbol (a bitmap form, or a quantity of available symbols, or a symbol point and an end symbol of the available symbols), and the like. The third indication information may include delay information. The delay information is used to indicate a quantity of available slots of the second carrier, or the delay information is used to indicate a quantity of available slots of the first carrier, so that uplink communication is implemented after the 5G NR terminal obtains the available resource of the second carrier.

Because carrier frequencies of two available carriers of 5G NR may vary greatly, subcarrier intervals, TTI lengths, and subframe lengths may be different. In other words, numbers of subframes of 5G NR on the two carriers are different.

Based on this, an available subframe of 5G NR on the shared LTE carrier needs to be pointed out.

On the second carrier, for 5G NR, numbering is performed according to a subframe structure of a 5G NR communication system, and for LTE, numbering is performed based on a subframe structure of an LTE communication system. Numbers corresponding to 5G NR and LTE may be different. The first base station may obtain an LTE idle subframe, which is converted into a subframe number of a 5G NR available subframe.

Optionally, methods for obtaining, by the 5G NR terminal, the available resource of the shared LTE carrier based on the third indication information may include method 1 and method 2.

In method 1, the 5G NR terminal may obtain, based on the timing of the second carrier, a subframe that is of the second carrier and that corresponds to a subframe in which the third indication information is sent by using the first carrier.

The terminal obtains an available subframe of the second carrier based on the delay information and the subframe that is of the second carrier and that corresponds to the subframe in which the third indication information is sent by using the first carrier, to perform uplink communication with the first base station by using the available subframe of the second carrier.

In an example, the first base station is an AP, the carrier f3 is the first carrier, and the carrier f2 is the second carrier, as shown in FIG. 3. The 5G NR terminal receives a DCI message sent by the AP on subframe n of the carrier f3, and obtains, based on timing of the carrier f2, subframe n1 of the carrier f2 corresponding to subframe n of the carrier f3. The DCI message includes uplink scheduling grant information, and if a sending delay carried in the uplink scheduling grant information is k, an available subframe of the 5G NR terminal on the carrier f2 is subframe (n1+k).

In method 2, after the 5G NR terminal receives the third indication information sent by the AP by using the first carrier, the 5G NR terminal may obtain an available subframe of the first carrier based on the delay information and a subframe in which the third indication information is sent by using the first carrier.

The 5G NR terminal obtains, based on the timing of the second carrier, an available subframe of the second carrier corresponding to the available subframe of the first carrier, to communicate with the 5G NR terminal by using an available subframe of the shared LTE carrier.

In an example, as shown in FIG. 4, the first base station is an AP, the carrier f3 is the first carrier, and the carrier f2 is the second carrier. The terminal receives a DCI message sent by the AP on subframe n of the carrier f3, and the DCI message includes uplink scheduling grant information. If a sending delay carried in the uplink scheduling grant information is k, the terminal obtains available subframe (n+k) of the carrier f3 based on the sending delay k and subframe n at which the DCI message is sent, and obtains, based on the timing of the carrier f2, subframe m of the carrier f2 corresponding to available subframe (n+k) of the carrier f3.

It may be understood that, without affecting LTE transmission, the 5G NR may be configured in a semi-static or dynamic manner to be in a frequency band shared with the LTE.

Optionally, LTE periodic resource configuration information, such as a PUCCH and an SRS, may exist in the available subframe of the second carrier. Therefore, for the 5G NR terminal, a resource that needs to be occupied by the LTE PUCCH and the SRS is unavailable.

Therefore, the first base station may send fourth indication information to the 5G NR terminal, where the fourth indication information is used to indicate resource configuration information of the second carrier, for example, a periodic resource usage location such as LTE PUCCH and SRS resources, so that the terminal obtains the unavailable resource on the second carrier, that is, the 5G NR terminal avoids the unavailable resource on the available subframe, to communicate with the first base station. The fourth indication information may be notified to the 5G NR terminal by using a system message or an RRC signaling message.

It should be noted that, the fourth indication information and the third indication information may be sent in a same higher layer signaling message, or may be sent in different higher layer signaling messages. Before sending the fourth indication information to the 5G NR terminal, the first base station needs to convert subframe structures of the LTE PUCCH and SRS and a resource usage location of numbering into subframe structures and the resource usage location of the numbering that support 5G NR.

According to the communication method provided in this embodiment of the present invention, the first base station determines the timing offset of the first carrier (for example, the 5G NR dedicated carrier) and the second carrier (the carrier shared with LTE), and sends the first indication information to the terminal to indicate the timing offset, so that the terminal determines the timing of the second carrier. In the method, an indication of the timing offset is used, so that the terminal obtains a time location of the shared frequency band, and a shared carrier resource can be used, thereby improving resource utilization.

Figure 6:
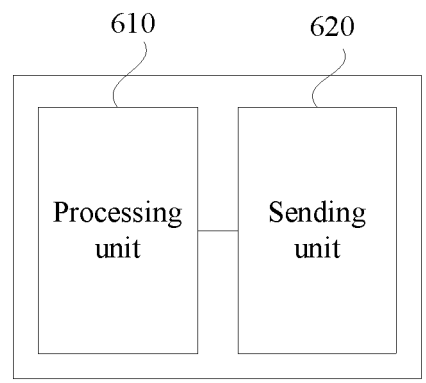
FIG. 6 is a schematic structural diagram of an access network device according to an embodiment of the present invention.

Corresponding to the foregoing method, an embodiment of the present invention further provides an access network device, where the access network device is the first access network device in the foregoing method. As shown in FIG. 6, the access network device may include a processing unit 610 and a sending unit 620.

The processing unit 610 is configured to determine a timing offset of a first carrier and a second carrier, where the timing offset is an offset between timing of downlink communication of the first carrier and timing of uplink communication of the second carrier. The sending unit 620 is configured to send first indication information to a terminal, where the first indication information is used to indicate the timing offset, and the timing offset is used to determine the timing of the second carrier.

Optionally, the first carrier is a carrier using a first radio access technology RAT, such as a 5G NR dedicated carrier, and the second carrier is an uplink FDD carrier using the first RAT and a second RAT, such as a shared carrier.

Optionally, the processing unit 610 is specifically configured to determine the timing offset of the first carrier of the access network device and the second carrier of the first access network device.

Optionally, the sending unit 620 is specifically configured to send the first indication information to the terminal by using a system message carried on the first carrier.

Optionally, the access network device further includes a receiving unit 630.

The receiving unit 630 is configured to receive second indication information, such as a second timing offset, sent by a second access network device (another access network device other than the access network device). The second indication information is used to indicate a timing offset of a first carrier of the second access network device and a second carrier of the second access network device. The access network device is a source access network device accessed by the terminal, and the second access network device is a target access network device for handover of the terminal.

Optionally, the processing unit 610 is further specifically configured to determine a timing offset of the first carrier of the second access network device and the second carrier of the second access network device based on third indication information.

Optionally, the sending unit 620 is further specifically configured to send the first indication information, such as indication information of the second timing offset, to the terminal by using a system message or radio resource control connection reconfiguration message carried on the first carrier.

Optionally, the access network device further includes a receiving unit 630. The sending unit 620 is further configured to send the third indication information to the terminal by using higher layer signaling carried on the first carrier, where the third indication information is used to indicate an available resource of the second carrier. The receiving unit 630 is configured to receive, on the second carrier, a signal sent by the terminal by using the available resource.

Optionally, the sending unit 620 is further configured to send the third indication information to the terminal by using physical layer signaling carried on the first carrier, where the third indication information includes delay information, and the delay information is used to indicate a quantity of available slots of the second carrier, or the delay information is used to indicate a quantity of available slots of the first carrier.

Optionally, the sending unit 620 is further configured to send fourth indication information to the terminal, where the fourth indication information is used to indicate resource configuration information of the second carrier, and a resource indicated by the resource configuration information of the second carrier is an unavailable resource of the terminal.

Functions of function units of the access network device may be implemented by using the steps in the foregoing embodiment. Therefore, a specific work process of the access network device provided in this embodiment of the present invention is not described herein again.

Figure 7:
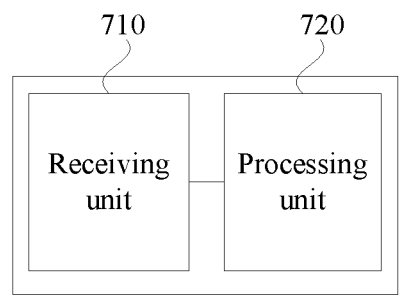
FIG. 7 is a schematic structural diagram of a terminal according to an embodiment of the present invention.

Corresponding to the foregoing method, a terminal is provided in an embodiment of the present invention, as shown in FIG. 7. The terminal may include a receiving unit 710 and a processing unit 720.

The receiving unit 710 is configured to receive first indication information from a first access network device, where the first indication information is used to indicate a timing offset of a first carrier and a second carrier, and the timing offset is an offset between timing of downlink communication of the first carrier and timing of uplink communication of the second carrier.

The processing unit 720 is configured to determine the timing of the second carrier based on the timing of the first carrier and the timing offset.

Optionally, the first carrier is a carrier using a first radio access technology RAT, and the second carrier is an uplink FDD carrier using the first RAT and a second RAT.

Optionally, the timing offset is a timing offset of a first carrier of the first access network device and a second carrier of the first access network device.

Optionally, the receiving unit 710 is specifically configured to receive, by using a system message carried on the first carrier, the first indication information from the first access network device.

Optionally, when the first indication information is used to indicate the timing offset between the first carrier and the second carrier of the first access network device, the processing unit 720 is configured to determine the timing of the second carrier of the first access network device based on timing offset between the first carrier and the second carrier of the first access network device.

Optionally, the timing offset is a timing offset of a first carrier of a second access network device and a second carrier of the second access network device, where the second access network device is a target access network device for handover of the terminal.

The processing unit 720 is configured to determine timing of the second carrier of the second access network device based on the timing offset of the first carrier of the second access network device and the second carrier of the second access network device, and the timing of the first carrier of the second access network device.

Optionally, the terminal further includes a sending unit 730. The receiving unit 710 is further configured to receive, by using higher layer signaling carried on the first carrier, third indication information from the first access network device, where the third indication information is used to indicate an available resource of the second carrier. The sending unit 730 is configured to send a signal to the first access network device by using the available resource.

Optionally, the receiving unit 710 is further configured to receive, by using physical layer signaling carried on the first carrier, the third indication information from the first access network device, where the third indication information includes delay information, and the delay information is used to indicate a quantity of available slots of the second carrier, or the delay information is used to indicate a quantity of available slots of the first carrier.

Optionally, the delay information is used to indicate the quantity of available slots of the second carrier.

The processing unit 720 is configured to obtain, based on the timing of the second carrier, a slot that is of the second carrier and that corresponds to a slot in which second indication information is received.

The processing unit 720 is further configured to obtain the available resource of the second carrier based on the slot of the second carrier and the delay information, to communicate with the first access network device by using the available resource of the second carrier.

Optionally, the delay information is used to indicate the quantity of available slots of the first carrier.

The processing unit 720 is configured to obtain an available slot of the first carrier based on the delay information and a slot in which the third indication information is received.

The processing unit 720 is further configured to obtain, based on the timing of the second carrier, an available resource that is of the second carrier and that corresponds to the available slot of the first carrier, to communicate with the first access network device by using the available resource of the second carrier.

Optionally, the receiving unit 710 is further configured to receive fourth indication information from the first access network device, where the fourth indication information is used to indicate resource configuration information of the second carrier, and a resource indicated by the resource configuration information of the second carrier is an unavailable resource of the terminal.

Optionally, the processing unit 720 is configured to determine a subframe boundary of the second carrier based on a subframe boundary of the first carrier and the timing offset, or determine a symbol boundary of the second carrier based on a symbol boundary of the first carrier and the timing offset.

Optionally, the processing unit 720 is configured to determine, based on the timing offset and a subframe boundary or symbol boundary of the first carrier, a start location at which an uplink signal is sent on the second carrier.

Functions of function units of the terminal may be implemented by using the steps in the foregoing embodiment. Therefore, a specific work process of the terminal provided in this embodiment of the present invention is not described herein again.

Figure 8:
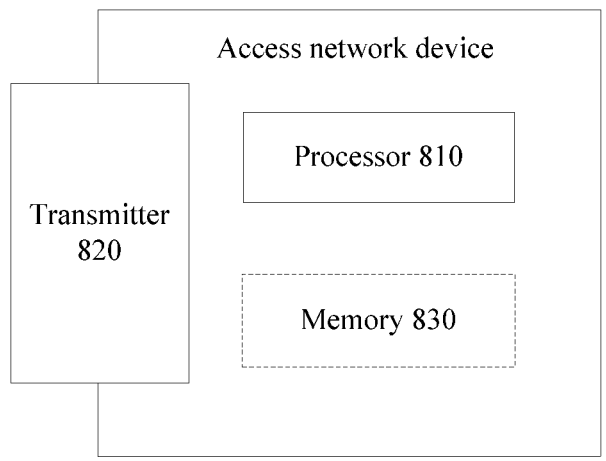
FIG. 8 is a schematic structural diagram of another access network device according to an embodiment of the present invention.

FIG. 8 is another possible schematic structural diagram of the access network device in the foregoing embodiments, and the access network device includes at least a processor 810 and a transmitter 820.

Optionally, the access network device may further include a memory 830.

The processor 810 may be a central processing unit (CPU), or a combination of the CPU and a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 810 is configured to control the entire access network device and signal processing.

The memory 830 may include a volatile memory, such as a random access memory (RAM), and the memory 830 may also include a nonvolatile memory, such as a read-only memory (ROM), a flash memory, a hard disk, or a solid state disk. The memory 830 may further include a combination of the foregoing types of memories. The memory 830 is configured to store various applications, operating systems and data. The memory 830 may transmit the stored data to the processor 810.

It may be understood that, the memory 830 may be integrated into the processor 810, or may exist independently.

The processor 810 is configured to determine a timing offset of a first carrier and a second carrier, where the timing offset is an offset between timing of downlink communication of the first carrier and timing of uplink communication of the second carrier. The first carrier is a carrier using a first radio access technology RAT, and the second carrier is an uplink FDD carrier using the first RAT and a second RAT.

The transmitter 820 is configured to send first indication information to a terminal, where the first indication information is used to indicate the timing offset, and the timing offset is used to determine timing of the second carrier. The transmitter 820 may be an antenna.

It should be noted that, the processor 810 may be replaced by the processing unit 610 in FIG. 6, and the transmitter 820 may be replaced by the sending unit 620 in FIG. 6. In this embodiment, for an implementation of resolving a problem by components of the access network device and a benefit, refer to the method implementation and the benefit shown in FIG. 2. Therefore, details are not described herein again.

Figure 9:
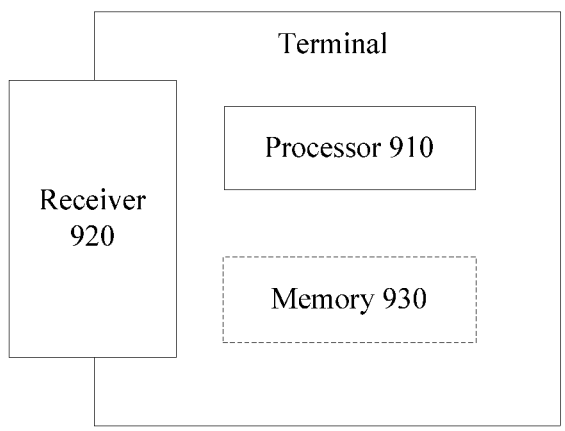
FIG. 9 is a schematic structural diagram of another terminal according to an embodiment of the present invention.

FIG. 9 is another possible schematic structural diagram of the terminal in the foregoing embodiments, and the terminal includes at least a processor 910 and a receiver 920.

Optionally, the terminal may further include a memory 930.

The processor 910 may be a central processing unit CPU, or a combination of the CPU and a hardware chip. The hardware chip may be an application-specific integrated circuit ASIC, a programmable logic device PLD, or a combination thereof. The PLD may be a complex programmable logic device CPLD, a field-programmable gate array FPGA, a generic array logic GAL, or any combination thereof. The processor 910 is configured to control the entire access network device and signal processing.

The memory 930 may include a volatile memory, such as a random access memory (RAM), and the memory 930 may also include a nonvolatile memory, such as a read-only memory (ROM), a flash memory, a hard disk, or a solid state disk. The memory 930 may further include a combination of the foregoing types of memories. The memory 930 is configured to store various applications, operating systems and data. The memory 930 may transmit the data stored to the processor 910.

It may be understood that, the memory 930 may be integrated into the processor 910, or may exist independently.

The receiver 920 is configured to receive first indication information from a first access network device, where the first indication information is used to indicate a timing offset of a first carrier and a second carrier, and the timing offset is an offset between timing of downlink communication of the first carrier and timing of uplink communication of the second carrier. The first carrier is a carrier using a first radio access technology RAT, and the second carrier is an uplink FDD carrier using the first RAT and a second RAT.

The processor 910 is configured to determine timing of the second carrier based on timing of the first carrier and the timing offset.

It should be noted that, the receiver 920 may be replaced by the receiving unit 710 in FIG. 7, and the processor 910 may be replaced by the processing unit 720 in FIG. 7. In this embodiment, for an implementation of resolving a problem by components of the terminal and a benefit, refer to the method implementation and the benefit shown in FIG. 2. Therefore, details are not described herein again.

Steps of methods or algorithms described in the embodiments disclosed in this specification may be implemented by hardware, a software module executed by a processor, or a combination thereof. A software instruction may include a corresponding software module, and the software module may be stored in a random access memory, a flash memory, a read-only memory, an erasable programmable read-only memory (EPROM), an electrically erasable programmable read-only memory (EEPROM), a hard disk, a compact disc, or any another storage medium form that is well known in the art. For example, a storage medium is coupled to a processor, so that the processor can read information from the storage medium or write information into the storage medium. Certainly, the storage medium may be a component of the processor. Certainly, the processor and the storage medium may exist in the user equipment as discrete components.

A person skilled in the art should be aware that in the foregoing one or more examples, functions described in this application may be implemented by hardware, software, firmware, or any combination thereof. When implemented by the software or the firmware, the functions may be stored in a computer readable medium.

The objectives, technical solutions, and benefits of this application are further described in detail in the foregoing specific embodiments. It should be understood that the foregoing descriptions are merely specific embodiments of this application, but are not intended to limit the protection scope of this application. Any modification or improvement made on the basis of the technical solutions of this application shall fall within the protection scope of this application.

What is claimed is:

1. A method, comprising:
receiving, by a terminal, first indication information from a first access network device, wherein the first indication information indicates a timing offset of a first carrier and a second carrier, the timing offset is an offset between a timing of a downlink communication of the first carrier and a timing of an uplink communication of the second carrier, wherein the second carrier is an uplink frequency division duplex (FDD) carrier using a first radio access technology (RAT) and a second RAT, and wherein the first carrier uses only the first RAT, wherein the first RAT is new radio (NR) and the second RAT is Long Term Evolution (LTE); and
determining, by the terminal, the timing of the uplink communication of the second carrier based on the timing of the downlink communication of the first carrier and the timing offset.

2. The method according to claim 1, wherein the timing offset indicates a time difference between:
a subframe or symbol boundary of the first carrier; and
a start location at which a physical random access channel (PRACH) is sent on the second carrier.

3. The method according to claim 1, wherein the first carrier is of the first access network device and the second carrier is of the first access network device.

4. The method according to claim 1, wherein receiving the first indication information comprises:
receiving, using a system message carried on the first carrier, the first indication information from the first access network device.

5. The method according to claim 1, further comprising:
receiving, by the terminal using physical layer signaling carried on the first carrier, third indication information from the first access network device, wherein the third indication information comprises delay information, and the delay information indicates:
a quantity of available slots of the second carrier; or
a quantity of available slots of the first carrier.

6. The method according to claim 5, wherein the delay information indicates the quantity of available slots of the second carrier, and the method further comprises:
obtaining, by the terminal, a slot of the second carrier based on the timing of the uplink communication of the second carrier, wherein the slot of the second carrier is on the second carrier and corresponds to a slot in which the third indication information is received;
obtaining, by the terminal, an available resource of the second carrier based on the slot of the second carrier and the delay information; and
sending, by the terminal, a signal to the first access network device using the available resource of the second carrier.

7. The method according to claim 1, further comprising:
performing, by the terminal, an initial access procedure with the first access network device using the first RAT.

8. The method according to claim 7, wherein a subframe length of the first RAT is different than a subframe length of the second RAT.

9. The method according to claim 7, wherein a frame and subframe timing of the first carrier is in accordance with NR, and a frame and subframe timing of the second carrier is in accordance with LTE.

10. A terminal, comprising:
a receiver, configured to receive first indication information from a first access network device, wherein the first indication information indicates a timing offset of a first carrier and a second carrier, the timing offset is an offset between a timing of a downlink communication of the first carrier and a timing of an uplink communication of the second carrier, and wherein the second carrier is an uplink frequency division duplex (FDD) carrier using a first radio access technology (RAT) and a second RAT, and wherein the first carrier uses only the first RAT or only, and wherein the first RAT is new radio (NR) and the second RAT is Long Term Evolution (LTE);
a processor; and
a non-transitory computer-readable storage medium storing a program to be executed by the processor, the program including instructions for:
determining the timing of the uplink communication of the second carrier based on the timing of the downlink communication of the first carrier and the timing offset.

11. The terminal according to claim 10, wherein the timing offset indicates a time difference between:
a subframe or symbol boundary of the first carrier; and
a start location at which a physical random access channel (PRACH) is sent on the second carrier.

12. The terminal according to claim 10, wherein the first carrier is of the first access network device and the second carrier is of the first access network device.

13. The terminal according to claim 10, wherein the receiver is configured to receive, using a system message carried on the first carrier, the first indication information from the first access network device.

14. An apparatus comprised in a terminal, the apparatus comprising:

a non-transitory storage medium including executable instructions; and
a processor;
wherein the executable instructions, when executed by the processor, cause the apparatus to:
decode first indication information sent from a first access network device, wherein the first indication information indicates a timing offset of a first carrier and a second carrier, the timing offset is an offset between a timing of a downlink communication of the first carrier and a timing of an uplink communication of the second carrier, wherein the second carrier is an uplink frequency division duplex (FDD) carrier using a first radio access technology (RAT) and a second RAT, and wherein the first carrier uses only the first RAT, and wherein the first RAT is new radio (NR) and the second RAT is Long Term Evolution (LTE); and
determine the timing of the uplink communication of the second carrier based on the timing of the downlink communication of the first carrier and the timing offset.

15. The apparatus according to claim 14, wherein the timing offset indicates a time difference between:
a subframe or symbol boundary of the first carrier; and
a start location at which a physical random access channel (PRACH) is sent on the second carrier.

16. The apparatus according to claim 14, wherein the first carrier is of the first access network device and the second carrier is of the first access network device.

17. The apparatus according to claim 14, wherein the first indication information is received using a system message carried on the first carrier.

18. A non-transitory computer-readable storage medium comprising instructions which, when executed by a computer, cause the computer to:
decode first indication information sent from a first access network device, wherein the first indication information indicates a timing offset of a first carrier and a second carrier, the timing offset is an offset between a timing of a downlink communication of the first carrier and a timing of an uplink communication of the second carrier, wherein the second carrier is an uplink frequency division duplex (FDD) carrier using a first radio access technology (RAT) and a second RAT, and wherein the first carrier uses only the first RAT, and wherein the first RAT is new radio (NR) and the second RAT is Long Term Evolution (LTE); and
determine the timing of the uplink communication of the second carrier based on the timing of the downlink communication of the first carrier and the timing offset.

19. The non-transitory computer-readable storage medium according to claim 18, wherein the timing offset indicates a time difference between:
a subframe or symbol boundary of the first carrier; and
a start location at which a physical random access channel (PRACH) is sent on the second carrier.

20. The non-transitory computer-readable storage medium according to claim 18, wherein the first indication information is received using a system message carried on the first carrier.

* * * * *

UNITED STATES PATENT AND TRADEMARK OFFICE
CERTIFICATE OF CORRECTION

PATENT NO. : 11,729,754 B2
APPLICATION NO. : 16/504003
DATED : August 15, 2023
INVENTOR(S) : Sun et al.

It is certified that error appears in the above-identified patent and that said Letters Patent is hereby corrected as shown below:

In the Claims

Column 18, Claim 10, Lines 43-44, delete "RAT or only," and insert -- RAT, --.

Signed and Sealed this
Seventeenth Day of October, 2023

Katherine Kelly Vidal
*Director of the United States Patent and Trademark Office*